(12) United States Patent
Finlay et al.

(10) Patent No.: US 10,620,837 B2
(45) Date of Patent: *Apr. 14, 2020

(54) TUNING MEMORY ACROSS DATABASE CLUSTERS FOR DISTRIBUTED QUERY STABILITY

(71) Applicant: INTERNATIONAL BUSINESS MACHINES CORPORATION, Armonk, NY (US)

(72) Inventors: Ian R. Finlay, Uxbridge (CA); Christian M. Garcia-Arellano, Richmond Hill (CA); Adam J. Storm, Toronto (CA); Gennady Yakub, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 137 days.

This patent is subject to a terminal disclaimer.

(21) Appl. No.: 15/498,610

(22) Filed: Apr. 27, 2017

(65) Prior Publication Data

US 2017/0285965 A1    Oct. 5, 2017

Related U.S. Application Data

(63) Continuation of application No. 15/085,410, filed on Mar. 30, 2016.

(51) Int. Cl.
*G06F 3/06* (2006.01)
*G06F 9/50* (2006.01)
(Continued)

(52) U.S. Cl.
CPC ............ *G06F 3/0608* (2013.01); *G06F 3/067* (2013.01); *G06F 3/0629* (2013.01);
(Continued)

(58) Field of Classification Search
CPC ........ G06F 9/50; G06F 9/5072; G06F 3/0629; G06F 3/0631
See application file for complete search history.

(56) References Cited

U.S. PATENT DOCUMENTS 7,574,424 B2  8/2009  Chowdhuri
7,694,102 B2  4/2010  Garcia-Arellano et al.
(Continued)

OTHER PUBLICATIONS

IBM, "List of IBM Patents or Patent Applications Treated as Related (Appendix P)," May 2, 2017, p. 1-2.
(Continued)

*Primary Examiner* — Jeong S Park
(74) *Attorney, Agent, or Firm* — Robert C. Bunker

(57) ABSTRACT

A method for optimizing query compilation by tuning memory across a database cluster is provided. The method may include receiving, by a global memory tuner, memory configuration information from a plurality of nodes within the database cluster. The method may also include determining a node within the plurality of nodes having a least available memory value relative to a remainder of nodes within the plurality of nodes based on the received memory configuration information. The method may then include calculating a globally tuned memory value based on a memory value associated with the determined node. The method may further include determining a memory distribution based on the calculated globally tuned memory value. The method may also include sending the determined memory distribution to the plurality of nodes.

6 Claims, 6 Drawing Sheets

(51) Int. Cl.
*G06F 16/2453* (2019.01)
*G06F 16/2458* (2019.01)

(52) U.S. Cl.
CPC .......... *G06F 3/0631* (2013.01); *G06F 3/0644* (2013.01); *G06F 9/50* (2013.01); *G06F 16/2471* (2019.01); *G06F 16/24542* (2019.01); *G06F 9/5072* (2013.01)

(56) References Cited

U.S. PATENT DOCUMENTS

| | | | |
|---|---|---|---|
| 7,984,043 B1* | 7/2011 | Waas | G06F 16/8358 707/718 |
| 8,122,450 B2 | 2/2012 | Diao et al. | |
| 8,583,756 B2 | 11/2013 | Ng et al. | |
| 9,767,148 B2 | 9/2017 | Burger et al. | |
| 10,228,855 B2* | 3/2019 | Finlay | G06F 3/0608 |
| 2005/0166011 A1* | 7/2005 | Burnett | G06F 3/0605 711/112 |
| 2005/0235119 A1 | 10/2005 | Sechrest et al. | |
| 2009/0100004 A1 | 4/2009 | Andrei et al. | |
| 2011/0258378 A1* | 10/2011 | Ananthanarayanan | G06F 3/061 711/114 |
| 2012/0159513 A1* | 6/2012 | Pakhunov | G06F 9/52 719/314 |
| 2013/0132371 A1* | 5/2013 | Bharath | G06F 16/24542 707/719 |
| 2014/0317221 A1* | 10/2014 | Froening | G06F 13/28 709/212 |
| 2016/0246842 A1* | 8/2016 | Li | G06F 16/24532 |
| 2017/0285964 A1* | 10/2017 | Finlay | G06F 3/0608 |

OTHER PUBLICATIONS

Finlay et al., "Tuning Memory Across Database Clusters for Distributed Query Stability," Application and Drawings, Filed on Mar. 30, 2016, 30 Pages, U.S. Appl. No. 15/085,410.

IBM, "Self-Tuning Memory Management and Multiple Processor Systems," An IP.com Prior Art Database Technical Disclosure, Apr. 27, 2006, p. 1-7, IP.com No. IPCOM000135905D.

IBM, "self_tuning_mem—Self-Tuning Memory Configuration Parameter," IBM Knowledge Center: DB2 Version 9.7 for Linux, UNIX, and Windows, p. 1-2, https://www.ibm.com/support/knowledgecenter/api/content/nl/en-us/SSEPGG_9.7.0/com.ibm.db2.luw.admin.config.doc/doc/r0021626.html, Accessed on Mar. 30, 2016.

IBM, "Self-Tuning Memory in Partitioned Database Environments," IBM Knowledge Center: DB2 Version 9.7 for Linux, UNIX, and Windows, p. 1-2, https://www.ibm.com/support/knowledgecenter/api/content/nl/en-us/SSEPGG_9.7.0/com.ibm.db2.luw.admin.perf.doc/doc/c0023815.html, Accessed on Mar. 30, 2016.

Mell et al., "The NIST Definition of Cloud Computing," National Institute of Standards and Technology, Sep. 2011, p. 1-3, Special Publication 800-145.

Storm et al., "Adaptive Self-Tuning Memory in DB2," VLDB '06, Sep. 12-15, 2006, p. 1081-1092, VLDB Endowment, ACM, Seoul, Korea.

Weikum et al., "Towards Self-Tuning Memory Management for Data Servers," Bulletin of the IEEE Computer Society Technical Committee on Data Engineering, 1999, p. 3-11.

* cited by examiner

TUNING MEMORY ACROSS DATABASE CLUSTERS FOR DISTRIBUTED QUERY STABILITY

BACKGROUND

The present invention relates generally to the field of computing, and more particularly to distributed database memory tuning.

Database memory may be tuned across database nodes in a cluster that may be used to execute distributed database queries. Memory tuning within databases may use cost-based query optimization. A cost-based query optimizer may generate query plans based on available resources, including available memory. In a shared-nothing architecture, a centralized query optimizer may be used to compile queries at a given node and then distribute the query to all other nodes in the cluster.

SUMMARY

According to one exemplary embodiment, a method for tuning memory across a database cluster is provided. The method may include receiving, by a global memory tuner, memory configuration information from a plurality of nodes within the database cluster. The method may also include determining a node within the plurality of nodes having a least available memory value relative to a remainder of nodes within the plurality of nodes based on the received memory configuration information. The method may then include calculating a globally tuned memory value based on a memory value associated with the determined node. The method may further include determining a memory distribution based on the calculated globally tuned memory value. The method may also include sending the determined memory distribution to the plurality of nodes.

According to another exemplary embodiment, a computer system for tuning memory across a database cluster is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving, by a global memory tuner, memory configuration information from a plurality of nodes within the database cluster. The method may also include determining a node within the plurality of nodes having a least available memory value relative to a remainder of nodes within the plurality of nodes based on the received memory configuration information. The method may then include calculating a globally tuned memory value based on a memory value associated with the determined node. The method may further include determining a memory distribution based on the calculated globally tuned memory value. The method may also include sending the determined memory distribution to the plurality of nodes.

According to yet another exemplary embodiment, a computer program product for tuning memory across a database cluster is provided. The computer program product may include one or more computer-readable storage devices and program instructions stored on at least one of the one or more tangible storage devices, the program instructions executable by a processor. The computer program product may include program instructions to receive, by a global memory tuner, memory configuration information from a plurality of nodes within the database cluster. The computer program product may also include program instructions to determine a node within the plurality of nodes having a least available memory value relative to a remainder of nodes within the plurality of nodes based on the received memory configuration information. The computer program product may then include program instructions to calculate a globally tuned memory value based on a memory value associated with the determined node. The computer program product may further include program instructions to determine a memory distribution based on the calculated globally tuned memory value. The computer program product may also include program instructions to send the determined memory distribution to the plurality of nodes.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
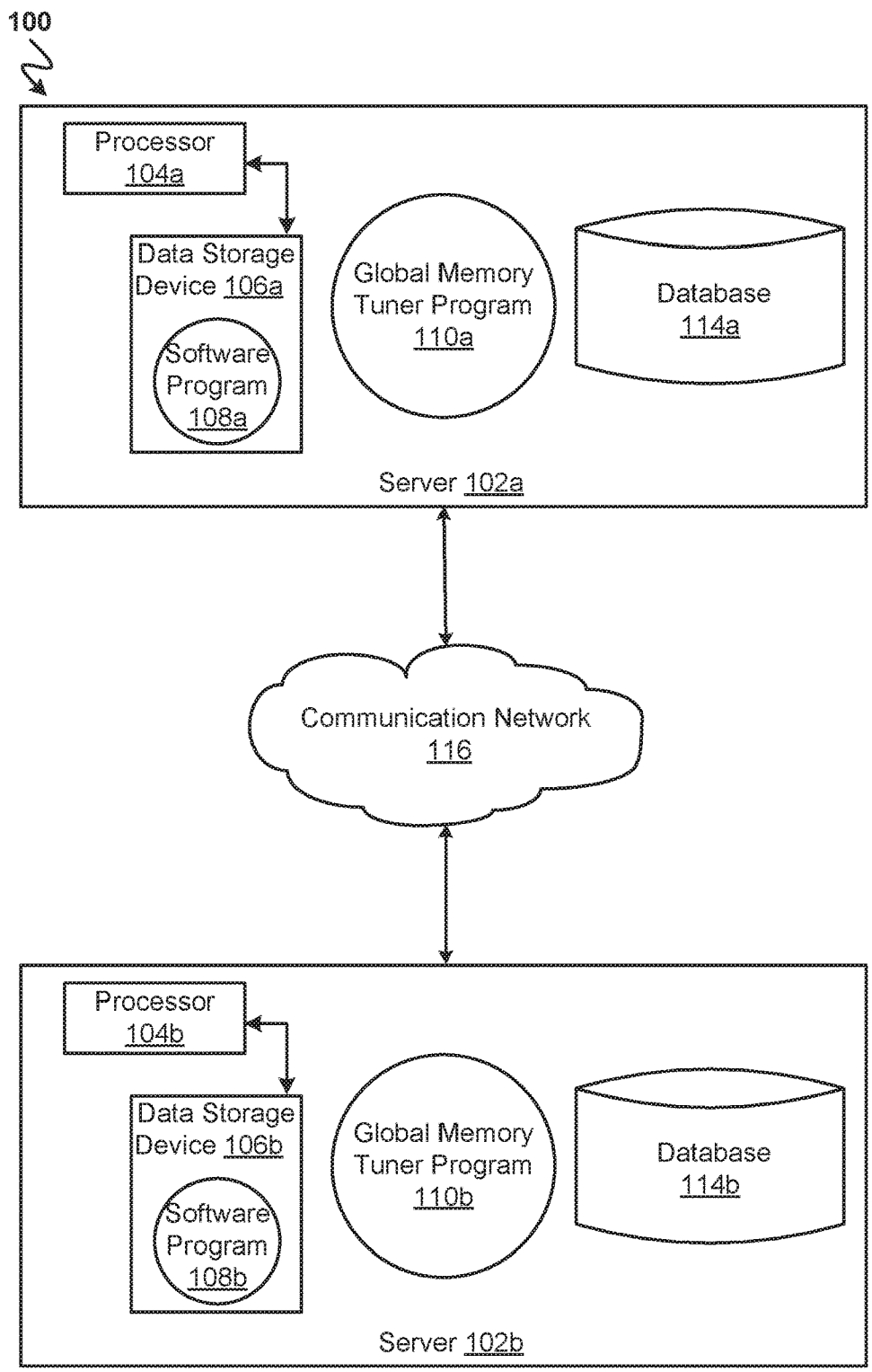
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product to tune database memory for query stability. As such, the present embodiment has the capacity to improve the technical field of distributed database memory tuning by configuring memory across nodes having differing available resources without negatively impacting query optimization. More specifically, memory configuration data may be collected from nodes within a cluster and then the node with the least amount of available physical memory may be determined. Thereafter, a memory distribution is determined based on the node with the least amount of available memory and then the determined distribution may be sent to the other nodes within the cluster.

As described previously, database memory may be tuned across database nodes in a cluster that may be used to execute distributed database queries. Memory tuning within databases may use cost-based query optimization. A cost-based query optimizer may generate query plans based on available resources, including available memory. In a shared-nothing architecture, a centralized query optimizer may be used to compile queries at a given node and then distribute the query to all other nodes in the cluster. Therefore, if a query is optimized at one node within the cluster and if the query is then distributed to the other nodes in the cluster (with different memory configurations), the query may exhibit poor and unpredictable query performance. As such, it may be advantageous to, among other things, provide a way to uniformly tune memory across the nodes of a database cluster to enhance query stability.

According to at least one embodiment, a local memory tuner (LMT) may be present on each database node within the cluster. Additionally, a global memory tuner (GMT) may be present on one node within the database cluster. The GMT may periodically collect memory configuration information from each node to determine how much memory may be available for tuning across the nodes of the cluster. Then, the GMT may determine which node has the least amount of available physical memory. The determined least amount of available physical memory may then become the globally tuned memory amount for each node within the cluster. Alternatively, the globally tuned memory may be determined to be less than the amount of physical memory on the smallest node in the cluster, thus leaving some locally tuned memory available at all nodes in the cluster. Next, the GMT determines a distribution for the globally tuned memory using aggregated cost/benefit data obtained from remote members (e.g., local benefit collectors (LBC)). After the distribution is determined, the distribution may be sent to each node for the nodes to apply and the node with the GMT may apply the distribution locally. Thus, each node may have similar starting memory configurations.

While the GMT is tuning globally tuned memory, the LMTs may also tune the memory within nodes. The LMTs may be limited to tuning memory not partitioned for the globally tuned memory (i.e., the total physical memory on a node minus the globally tuned memory partition). This remaining physical memory (i.e., locally tuned memory) may differ by node depending on how much total physical memory the node has. If the globally tuned memory is calculated as the amount of memory on the node in the cluster with the least amount of physical memory, there may be at least one node that may not have an active LMT. The LMTs may determine how to distribute the locally tuned memory and apply configuration changes locally. Thus, each node within the cluster may determine how to best use any additional memory.

According to at least one embodiment, a centralized query optimizer in each node may only consider the memory configuration specified by the GMT as input. Thus, the generated query plans may be based on the memory configuration that may be guaranteed to be configured for each node within the cluster. Resulting query plans may therefore be generated consistently in terms of memory inputs.

Referring to FIG. 1, an exemplary networked computer environment 100 in accordance with one embodiment is depicted. The networked computer environment 100 may include a server 102*a* with a processor 104*a* and a data storage device 106*a* that is enabled to run a software program 108*a* and a global memory tuner program 110*a* that may interact with a database 114*a*. The networked computer environment 100 may also include a second server 102*b* with a processor 104*b* and a data storage device 106*b* that is enabled to run a software program 108*b* and a global memory tuner program 110*b* that may interact with a database 114*b* and a communication network 116. The networked computer environment 100 may include a plurality of servers 102*a* and 102*b*, only two of which are shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The server 102*a* may communicate with the server 102*b* via the communications network 116. The communications network 116 may include connections, such as wire, wireless communication links, or fiber optic cables. As will be discussed with reference to FIG. 4, server 102*a* may include internal components 902*a* and external components 904*a*, respectively, and server 102*b* may include internal components 902*b* and external components 904*b*, respectively. Servers 102*a* and 102*b* may also operate in a cloud computing service model, such as Software as a Service (SaaS), Platform as a Service (PaaS), or Infrastructure as a Service (IaaS). Servers 102*a* and 102*b* may also be located in a cloud computing deployment model, such as a private cloud, community cloud, public cloud, or hybrid cloud. Servers 102*a* and 102*b* may be, for example, a mobile device, a telephone, a personal digital assistant, a netbook, a laptop computer, a tablet computer, a desktop computer, or any type of computing devices capable of running a program, accessing a network, and accessing a database 114*a*, 114*b*. According to various implementations of the present embodiment, the global memory tuner program 110*a*, 110*b* may interact with a database 114*a*, 114*b* that may be embedded in various storage devices, such as, but not limited to a computer/mobile device, a networked server 102*a*, 102*b*, or a cloud storage service.

According to the present embodiment, a user using a server 102*a*, 102*b* may use the global memory tuner program 110*a*, 110*b* (respectively) to tune the physical memory for each node in a cluster based on the node having the least amount of available physical memory. Thus, memory may be allocated consistently across the nodes of the cluster, thereby improving query stability. The global memory tuner process is explained in more detail below with respect to FIGS. 2 and 3.

Figure 2:
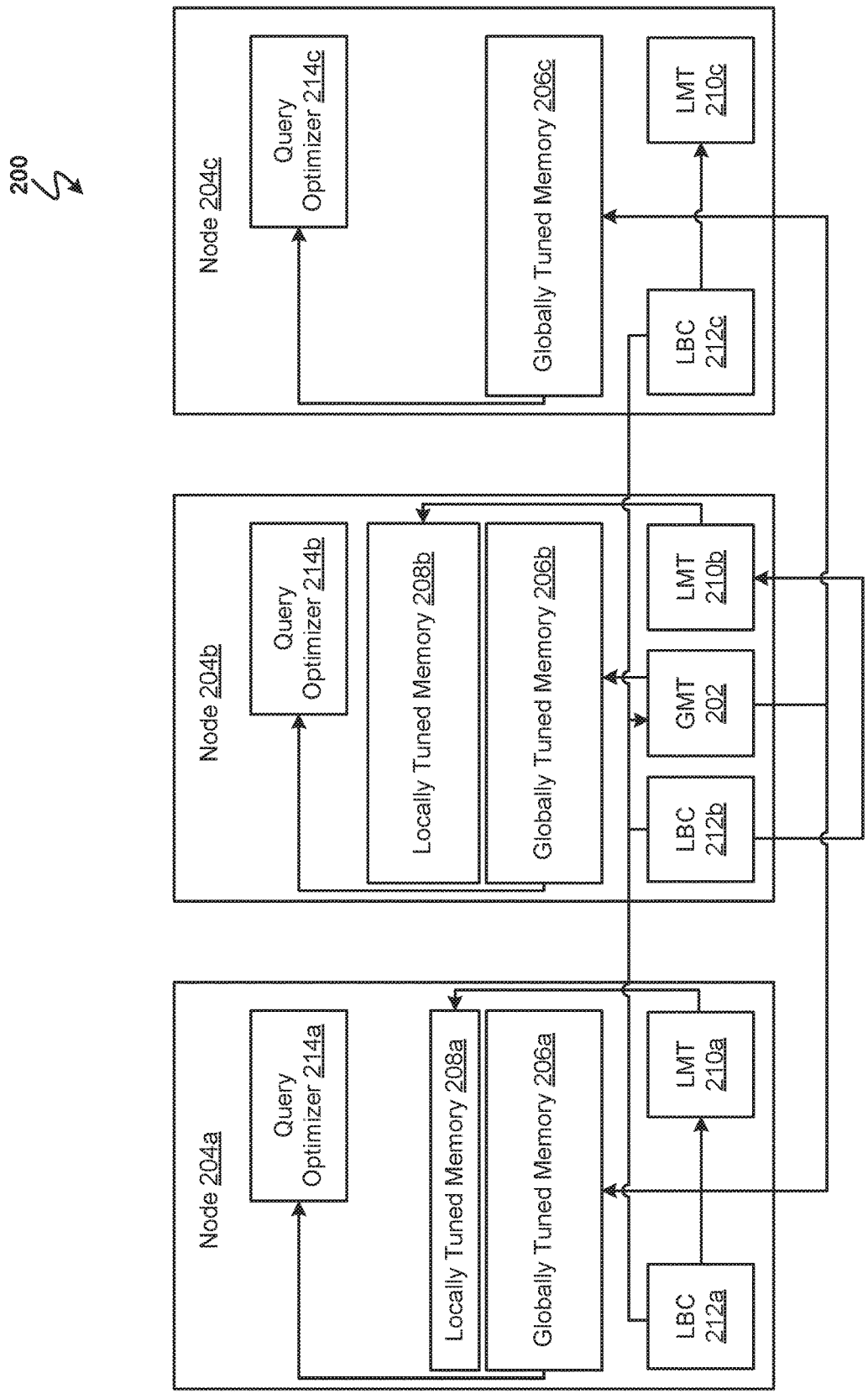
FIG. 2 is a block diagram of a database cluster having memory tuned by a global memory tuner according to at least one embodiment.

Referring now to FIG. 2, a block diagram of a database cluster 200 having memory tuned by the global memory tuner (GMT) 202 according to at least one embodiment is depicted. The cluster 200 may include one or more nodes 204*a*-*c* (e.g., server 102*a* (FIG. 1)) connectively coupled with the GMT 202 running on one of the nodes (e.g., 204*b*). Each node 204*a*-*c* within the cluster 200 may be connected (i.e., connectively coupled) via a communication network 116 (FIG. 1), whereby the nodes 204*a*-*c* within the cluster 200 may communicate with each other.

Furthermore, each node 204a-c may include physical memory that may be partitioned as globally tuned memory 206a-c and may also include additional physical memory partitioned as locally tuned memory 208a-b. Globally tuned memory 206a-c on all nodes 204a-c may be managed by the GMT 202, and locally tuned memory 208a-b, if present, may be managed by a local memory tuner (LMT) 210a-c. Cost/benefit data from each node 204a-c may be collected by a local benefit collector (LBC) 212a-c and transmitted (e.g., via a communication network 116 (FIG. 1)) to the GMT 202 for use in the managing globally tuned memory 206a-c for the nodes 204a-c in the cluster 200. Additionally, each node 204a-c may include a query optimizer 214a-c for determining the most efficient way to perform a query after considering multiple possible query plans. The query optimizer 214a-c may exclusively consider the globally tuned memory 206a-c when compiling a database query as the globally tuned memory 206a-c may be known to be available on each node 204a-c.

In the illustrated example database cluster 200, the GMT 202 runs on node 204b and collects local benefit data from the LBCs 212a-c to use in determining a globally beneficial memory configuration as will be described in detail below with respect to FIG. 3. Once a globally beneficial memory configuration has been determined, the new memory configuration may be sent out and applied to remote nodes 204a and 204c. Additionally, the new memory configuration may be applied locally to node 204b.

As depicted in FIG. 2, node 204c, having the least amount of physical memory, has all available physical memory in the node 204c partitioned as globally tuned memory 206c. The additional physical memory in the other nodes 204a-b may then be partitioned as locally tuned memory 208a-b managed by each node's 204a-b LMT 210a and 210b (respectively). The LMTs 210a-c may also receive benefit information from the LBCs 212a-c to determine how to best allocate the locally tuned memory 208a-b. Periodically, a new configuration may be applied to the locally tuned memory 208a-b using the LMTs 210a-c determination.

Thus, the globally tuned memory 206a-c may be tuned according to an aggregated global benefit and the locally tuned memory 208a-b may be tuned according to a local benefit. By separating the globally tuned memory 206a-c from the locally tuned memory 208a-b, the query optimizer 214a-c may be restricted to seeing only configuration changes made to the globally tuned memory 206a-c. This may ensure that no memory-related plan changes if the same query is compiled on different nodes 204a-c. Furthermore, partitioned globally tuned memory 206a-c may ensure that the physical memory assumed to be available at query compilation (i.e., globally tuned memory 206a-c) will be available at runtime (unless a memory reconfiguration occurs between query compilation and query execution).

Figure 3:
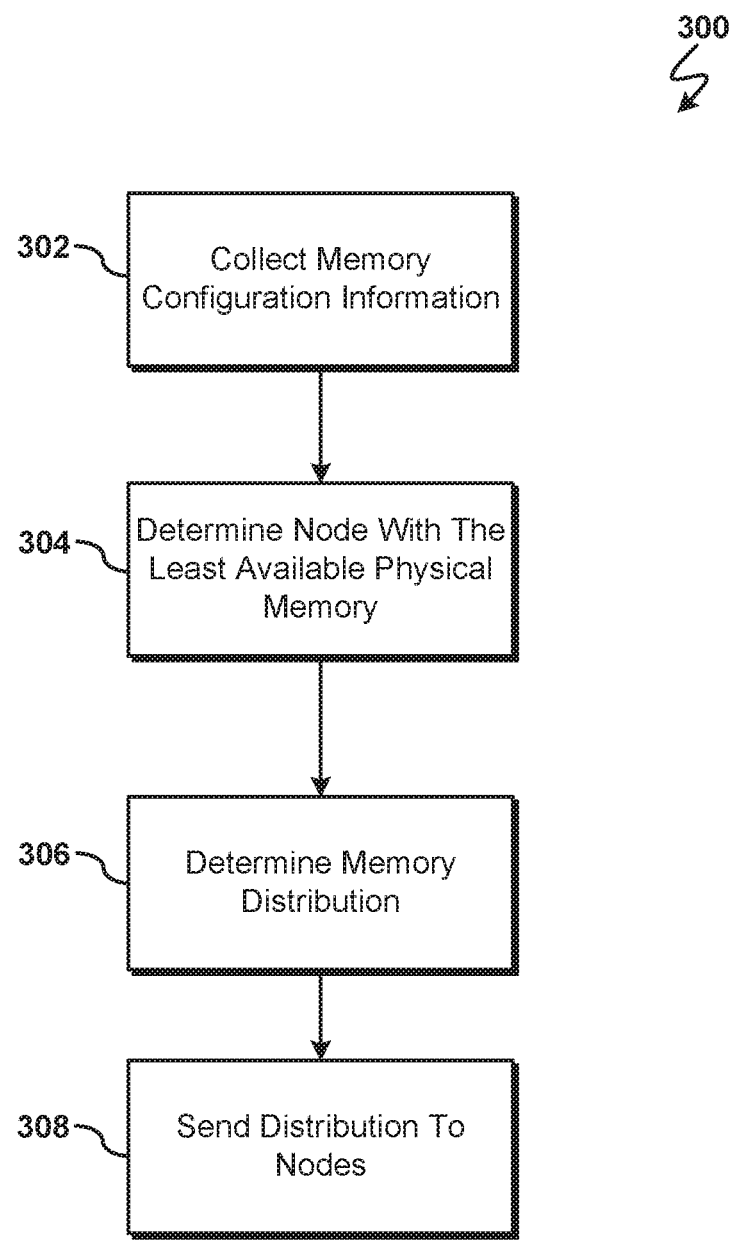
FIG. 3 is an operational flowchart illustrating a process for global database memory tuning according to at least one embodiment.

Referring now to FIG. 3, an operational flowchart illustrating the exemplary global database memory tuner process 300 by the global memory tuner program 110a and 110b (FIG. 1) according to at least one embodiment is depicted.

At 302, memory configuration information is collected from the nodes 204a-c (FIG. 2) of the cluster 200 (FIG. 2). According to at least one embodiment, the GMT 202 (FIG. 2) may periodically collect memory configuration information from each node 204a-c (FIG. 2) to determine how much memory is available for tuning across the cluster 200 (FIG. 2). The memory configuration information may include a variety of memory-related information such as a memory value (i.e., physical memory value) indicating the amount of available physical memory (e.g., 32 gigabytes of available random access memory (RAM)).

Next, at 304, the node 204a-c (FIG. 2) with the least amount of available physical memory is determined. According to at least one embodiment, the GMT 202 (FIG. 2) may determine which node (e.g., 204c (FIG. 2)) within the cluster 200 (FIG. 2) has the least amount of available physical memory based on the collected memory configuration information. According to at least one implementation, the GMT 202 (FIG. 2) may compare the available physical memory values for each node 204a-c (FIG. 2) within the cluster 200 (FIG. 2) and generate a list of nodes 204a-c (FIG. 2) ordered from least available physical memory (i.e., the head of the list) to most available physical memory (i.e., tail of the list). After generating a complete ordered list, the GMT 202 (FIG. 2) may identify the node (e.g., 204c (FIG. 2)) having the least amount of available physical memory from the head of the list.

For example, if node 204a (FIG. 2) has 24 gigabytes of available physical memory, node 204b (FIG. 2) has 32 gigabytes of available memory, and node 204c (FIG. 2) has 16 gigabytes of available physical memory, then the resulting ordered list would have node 204c (FIG. 2) at the head of the list, then node 204a (FIG. 2), and then node 204b (FIG. 2) at the tail of the list. Thus, the GMT 202 (FIG. 2) would determine that node 204c (FIG. 2) has the least amount of available physical memory since node 204c (FIG. 2) is at the head of the ordered list.

According to at least one embodiment, the value of the globally tuned memory 206a-c (FIG. 2) for the nodes 204a-c (FIG. 2) within the cluster 200 (FIG. 2) may be set to equal the amount of available physical memory in the node (e.g., 204c (FIG. 2)) having the least amount of available physical memory. Any nodes (e.g., 204a-b (FIG. 2)) having additional memory beyond the least amount of available physical memory may partition the additional memory as locally tuned memory 208a-b (FIG. 2).

Continuing the previous example, node 204c (FIG. 2), having the least amount of available physical memory, would be used to set the globally tuned memory 206a-c (FIG. 2) to 16 gigabytes (i.e., the amount of available physical memory that node 204c (FIG. 2) has) for all nodes 204a-c. As such, all of the physical memory of node 204c (FIG. 2) would be partitioned as globally tuned memory 206c (FIG. 2). Node 204a (FIG. 2) would have any remaining physical memory (i.e., 8 gigabytes) partitioned for locally tuned memory 208a (FIG. 2) and node 204b (FIG. 2) would have any remaining physical memory (i.e., 16 gigabytes) partitioned for locally tuned memory 208b (FIG. 2).

According to at least one other embodiment, the value of the globally tuned memory 206a-c (FIG. 2) for the nodes 204a-c (FIG. 2) within the cluster 200 (FIG. 2) may be set to be less than the amount of available physical memory in the node (e.g., 204c (FIG. 2)) having the least amount of available physical memory. Thus, all nodes (e.g., 204a-c (FIG. 2)) may have additional memory that may be partitioned as locally tuned memory (e.g., 208a-b (FIG. 2)).

Then, at 306, the memory distribution for the nodes 204a-c (FIG. 2) in the cluster 200 (FIG. 2) is determined by the GMT 202 (FIG. 2). According to at least one embodiment, the LBCs 212a-c (FIG. 2) may collect cost/benefit information for the node 204a-c (FIG. 2) associated with the LBC 212a-c (FIG. 2). Thereafter, the collected cost/benefit information may be transmitted to the GMT 202 (FIG. 2). Based on the aggregated cost/benefit information from the LBCs 212a-c (FIG. 2) and the least amount of available physical memory determined previously (i.e., at 304), the GMT 202 (FIG. 2) may determine a memory distribution for use by the nodes 204*a-c* (FIG. 2).

Next, at 308, the determined memory distribution is sent to the nodes 204*a-c* (FIG. 2). According to at least one embodiment, the GMT 202 (FIG. 2) may send the memory distribution data to the other nodes (e.g., 204*a* and 204*c* (FIG. 2)). Thereafter, the other nodes (e.g., 204*a* and 204*c* (FIG. 2)) may apply the memory distribution to the node's (e.g., 204*a* and 204*c* (FIG. 2)) physical memory. Furthermore, the node (e.g., 204*b* (FIG. 2)) hosting the GMT 202 (FIG. 2) may apply the memory configuration locally. Thus, the globally tuned memory 206*a-c* (FIG. 2) may be the same size (e.g., 16 gigabytes) across all nodes 204*a-c* (FIG. 2) in the cluster 200 (FIG. 2).

It may be appreciated that FIGS. 2 and 3 provide only an illustration of one embodiment and do not imply any limitations with regard to how different embodiments may be implemented. Many modifications to the depicted embodiment(s) may be made based on design and implementation requirements.

Figure 4:
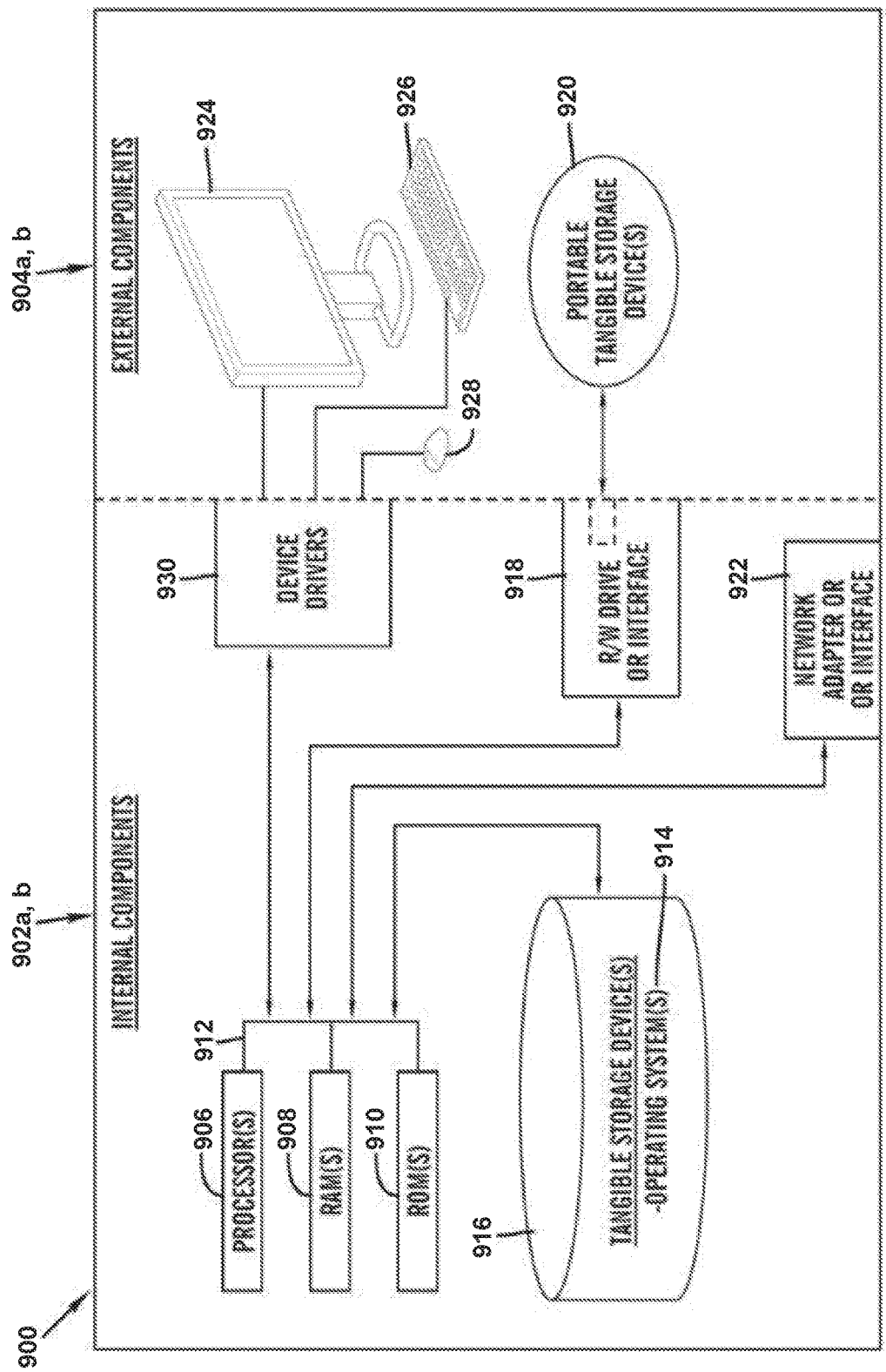
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Network server 102*a* (FIG. 1) and network server 102*b* (FIG. 1) may include respective sets of internal components 902 *a, b* and external components 904 *a, b* illustrated in FIG. 4. Each of the sets of internal components 902 *a, b* includes one or more processors 906, one or more computer-readable RAMs 908, and one or more computer-readable ROMs 910 on one or more buses 912, and one or more operating systems 914 and one or more computer-readable tangible storage devices 916. The one or more operating systems 914, the software program 108*a* (FIG. 1) and the global memory tuner program 110*a* (FIG. 1) in server 102*a* (FIG. 1), and the software program 108*b* (FIG. 1) and the global memory tuner program 110*b* (FIG. 1) in server 102*b* (FIG. 1) may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 *a, b* also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108*a* and 108*b* (FIG. 1) and the global memory tuner program 110*a* and 110*b* (FIG. 1) can be stored on one or more of the respective portable computer-readable tangible storage devices 920, read via the respective R/W drive or interface 918 and loaded into the respective hard drive 916.

Each set of internal components 902 *a, b* may also include network adapters (or switch port cards) or interfaces 922 such as a TCP/IP adapter cards, wireless wi-fi interface cards, or 3G or 4G wireless interface cards or other wired or wireless communication links. The software program 108*a* (FIG. 1) and the global memory tuner program 110*a* (FIG. 1) in server 102*a* (FIG. 1), and the software program 108*b* (FIG. 1) and the global memory tuner program 110*b* (FIG. 1) in network server 102*b* (FIG. 1) can be downloaded from an external computer (e.g., server) via a network (for example, the Internet, a local area network or other, wide area network) and respective network adapters or interfaces 922. From the network adapters (or switch port adaptors) or interfaces 922, the software program 108*a* (FIG. 1) and the global memory tuner program 110*a* (FIG. 1) in server 102*a* (FIG. 1), and the software program 108*b* (FIG. 1) and the global memory tuner program 110*b* (FIG. 1) in network server 102*b* (FIG. 1) are loaded into the respective hard drive 916. The network may comprise copper wires, optical fibers, wireless transmission, routers, firewalls, switches, gateway computers and/or edge servers.

Each of the sets of external components 904 *a, b* can include a computer display monitor 924, a keyboard 926, and a computer mouse 928. External components 904 *a, b* can also include touch screens, virtual keyboards, touch pads, pointing devices, and other human interface devices. Each of the sets of internal components 902 *a, b* also includes device drivers 930 to interface to computer display monitor 924, keyboard 926, and computer mouse 928. The device drivers 930, R/W drive or interface 918, and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
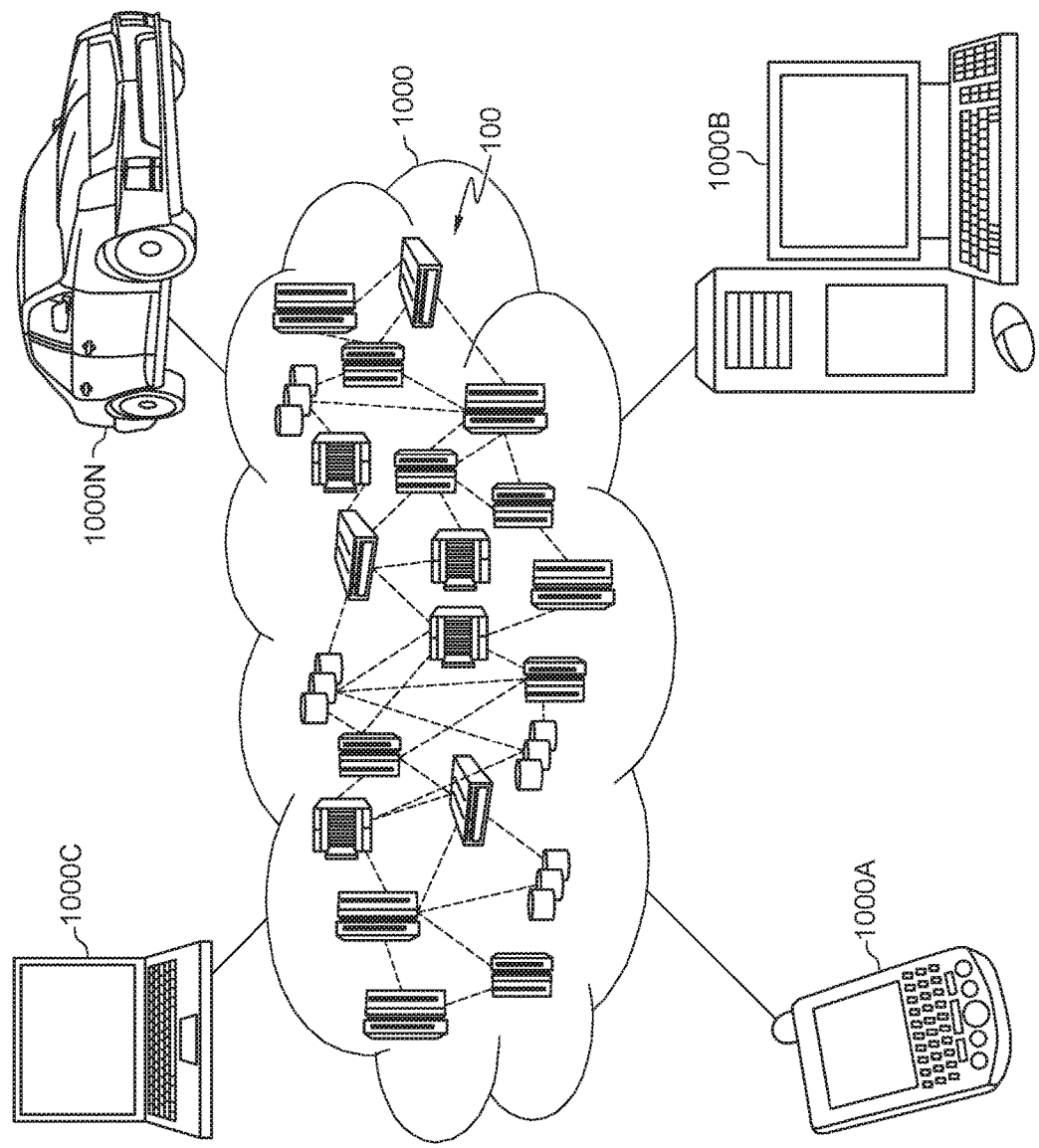
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
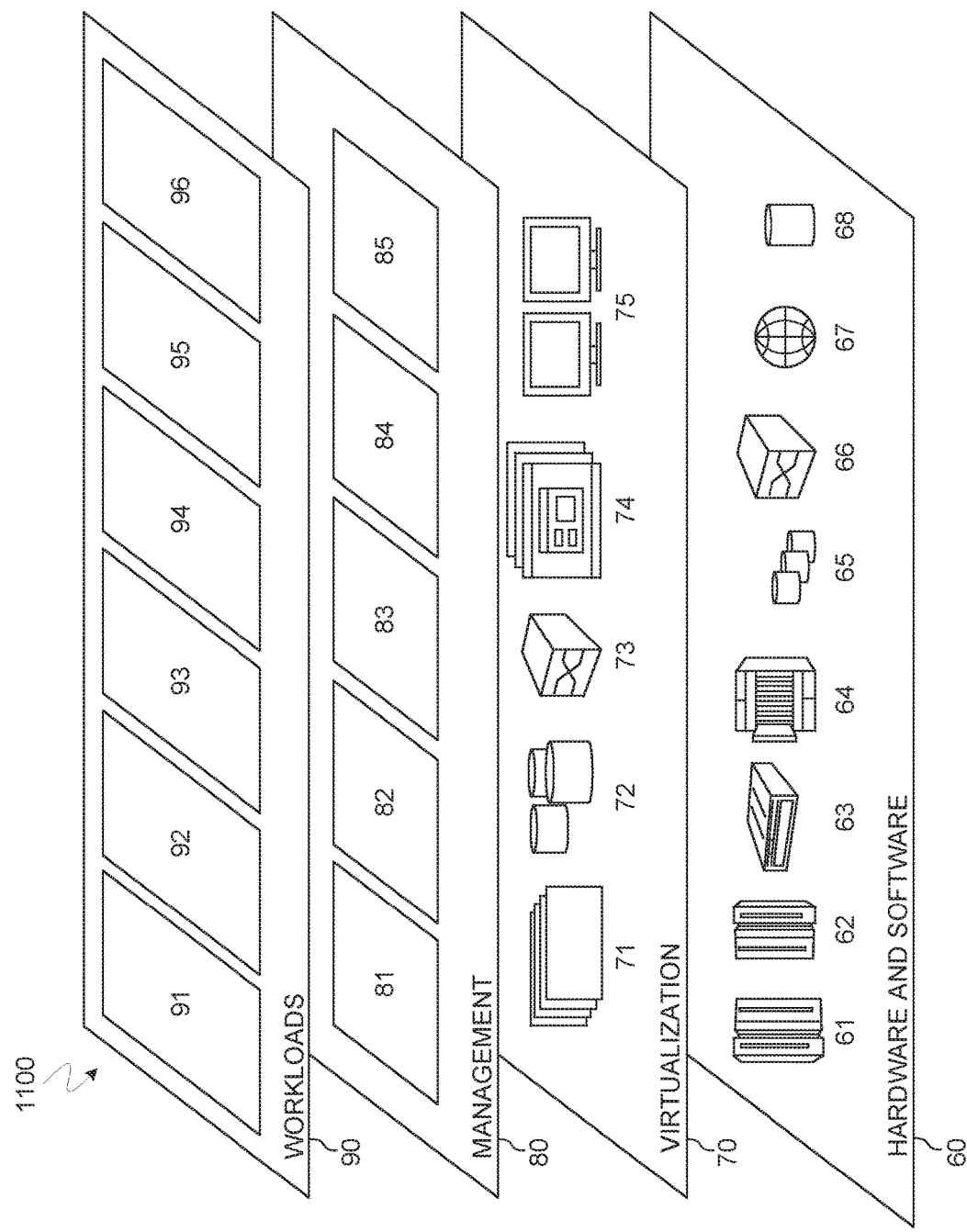
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and global memory tuner 96. A global memory tuner 96 provides a way to tune the physical memory for each node in a cluster based on the node having the least amount of available physical memory. Thus, memory may be allocated consistently across the nodes of the cluster, thereby improving query stability.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for tuning memory across a database cluster, the method comprising:
   receiving, by a global memory tuner, memory configuration information from a plurality of nodes within the database cluster, wherein the received memory configuration includes an available physical memory value for each node within the database cluster;
   determining a node within the plurality of nodes having a least available memory value relative to a remainder of nodes within the plurality of nodes based on the received memory configuration information;
   generating a globally tuned memory value to match the available physical memory value associated with the determined node;
   determining a memory distribution based on the generated globally tuned memory value;
   sending the determined memory distribution to the plurality of nodes, wherein each node within the plurality of nodes designates a memory portion equal to the calculated globally tuned memory value as a globally tuned memory partition; and
   generating at least one query plan based on the sent memory distribution, wherein the generated at least one query plan is restricted to using a memory amount specified by the globally tuned memory partition within the sent memory distribution for each node within the plurality of nodes.

2. The method of claim 1, wherein calculating the globally tuned memory value based on the memory value associated with the determined node comprises setting the globally tuned memory value to equal the memory value associated with the determined node.

3. The method of claim 1, wherein calculating the globally tuned memory value based on the memory value associated with the determined node comprises setting the globally tuned memory value to be less than the memory value associated with the determined node.

4. The method of claim 1, wherein sending the determined memory distribution to the plurality of nodes further includes each node within the plurality of nodes applying the sent memory distribution.

5. The method of claim 1, wherein, each node within the plurality of nodes having additional memory beyond the globally tuned memory partition further partitions the additional memory as locally tuned memory that is tuned by a local memory tuner, and wherein the local memory tuner determines how to distribute the locally tuned memory and apply configuration changes locally to the locally tuned memory.

6. The method of claim 1, wherein determining the memory distribution based on the calculated globally tuned memory value further comprises the global memory tuner using aggregated cost/benefit data collected from a local benefit collector associated with each node within the plurality of nodes.

* * * * *